United States Patent
Park et al.

(10) Patent No.: US 7,235,941 B2
(45) Date of Patent: Jun. 26, 2007

(54) PHASE COMMUTATION METHOD OF BRUSHLESS DIRECT CURRENT MOTOR

(75) Inventors: Pyeong Ki Park, Gwangju (KR); Koji Hamaoka, Gwangju (KR); Han Joo Yoo, Gwangju (KR); Jeong Ho Seo, Gwangju (KR); Hun Yub Bae, Gwangju (KR); Yun Jeong Kim, Gwangju (KR); Kwang Kyo Oh, Gwangju (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 11/240,365

(22) Filed: Oct. 3, 2005

(65) Prior Publication Data

US 2006/0138986 A1   Jun. 29, 2006

(30) Foreign Application Priority Data

Dec. 28, 2004   (KR) ...................... 10-2004-0114033

(51) Int. Cl.
*H02P 6/18* (2006.01)
(52) U.S. Cl. ........................ 318/439; 318/254; 318/721
(58) Field of Classification Search ................ 318/138, 318/254, 439, 720–724
See application file for complete search history.

(56) References Cited

U.S. PATENT DOCUMENTS

| | | | | |
|---|---|---|---|---|
| 4,712,050 A | * | 12/1987 | Nagasawa et al. | 318/254 |
| 5,057,753 A | * | 10/1991 | Leuthold et al. | 318/254 |
| 5,317,243 A | * | 5/1994 | Cameron | 318/254 |
| 5,436,547 A | * | 7/1995 | Nagai et al. | 318/801 |
| 5,726,543 A | * | 3/1998 | Park et al. | 318/254 |
| 5,739,652 A | * | 4/1998 | Sriram | 318/439 |
| 5,801,500 A | * | 9/1998 | Jensen et al. | 318/254 |
| 6,023,141 A | * | 2/2000 | Chalupa | 318/439 |
| 6,577,088 B2 | * | 6/2003 | Heydt et al. | 318/254 |
| 7,030,582 B2 | * | 4/2006 | Masino | 318/439 |

FOREIGN PATENT DOCUMENTS

KR   10-2004-0082194 A   9/2004

* cited by examiner

*Primary Examiner*—Bentsu Ro
(74) *Attorney, Agent, or Firm*—Sughrue Mion, PLLC (57) ABSTRACT

A BLDC motor phase commutation method is provided, which can correctly detect phase commutation timing and position detection timing of a BLDC motor in a compressor to stabilize rotation and RPM of the compressor, thereby minimizing noise and vibration. When the BLDC motor rotates through a mechanical angle corresponding to one period, the BLDC motor operates according to a first scheme in which operation of the BLDC motor in the first phase commutation section of a period is performed in the same manner as in the last phase commutation section of a period immediately prior to the period. After the BLDC motor switches to sensorless mode, the BLDC motor operates according to a third scheme in which the first phase commutation section of a period has a time interval equal to the average of time intervals of first phase commutation sections of periods prior to the period.

11 Claims, 5 Drawing Sheets

PHASE COMMUTATION METHOD OF BRUSHLESS DIRECT CURRENT MOTOR

CROSS-REFERENCE TO RELATED APPLICATION

This application claims priority from Korean Patent Application No. 2004-114033, filed on Dec. 28, 2004 in the Korean Intellectual Property Office, the disclosure of which is incorporated herein by reference.

BACKGROUND OF THE INVENTION

1. Field of the Invention

Methods consistent with the present invention relate to a phase commutation method of a Brushless Direct Current (BLDC) motor, and more particularly, to a phase commutation method of a BLDC motor that minimizes noise and vibration by accurately controlling phase commutation timing.

2. Description of the Related Art

A BLDC motor is a motor that uses a rectifier circuit composed of switching elements rather than mechanical elements such as a commutator and brushes. BLDC motors are characterized in that there is no need to replace brushes due to abrasion and noise and electromagnetic interference levels are low.

BLDC motors are typically used in products such as washing machines and compressors for use in refrigerators and air conditioners, which require high-performance, variable-speed operation.

To run a BLDC motor, the flux of a stator in the BLDC motor must be controlled to be at an electrical angle of 90 degrees or at any other suitable electrical angle with respect to the flux produced by a permanent magnet in a rotor of the BLDC motor. To accomplish this, the position of the rotor must be constantly detected to determine switching states of switching elements in the inverter and determine a position of the stator, where flux is to be produced, according to the detected rotor position. A resolver, an absolute encoder, a hall sensor or the like may be used to detect the rotor position. However, it is difficult for BLDC motors in compressors for refrigerators and air conditioners to use sensors due to environmental factors such as temperature and pressure, and therefore the BLDC motors use a sensorless method for detecting the rotor position from a voltage or current applied to the motors.

Driving methods of BLDC motors can be classified into a rectangular current waveform method and a sinusoidal current waveform method according to the waveforms of phase current applied to the motors.

In the sinusoidal current waveform driving method, the rotor position can be detected by detecting all three-phase voltages and currents. Generally, rotor position information of a mechanical angle corresponding to one period (i.e., 360 degrees) for compressors of refrigerators, air conditioners, or the like requires a resolution of 10 to 12 bits.

Compressors of refrigerators, air conditioners, or the like have a very large variation in load applied to a motor for each rotation of the motor due to consecutive operations of refrigerant gas such as intake, compression, and discharge. When the BLDC motor performs 10 to 12 phase commutations while rotating one turn (i.e., while rotating through a mechanical angle corresponding to one rotation), it is necessary to correctly determine the time when each phase commutation is performed and the time when position detection is performed.

However, conventional BLDC motor phase commutation methods have not provided how to effectively or correctly determine when to perform a first phase commutation of the next period after the BLDC motor rotates through a mechanical angle corresponding to one rotation, so that noise and vibration is severe when the phase commutation method is used for inverter refrigerators or the like having a large variation in load applied to motors.

In addition, in the conventional phase commutation methods, when the BLDC motor operates stably after switching to sensorless mode, it performs phase commutation in the same manner as when the BLDC motor is in initial startup mode. Thus, the conventional phase commutation methods cannot perform phase commutation taking into consideration the characteristics of different operating modes of the BLDC motor.

SUMMARY OF THE INVENTION

It is an aspect of the invention to provide a BLDC motor phase commutation method in which phase commutation timing and position detection timing of a BLDC motor in a compressor are correctly detected to stabilize rotation and RPM of the compressor, thereby minimizing noise and vibration.

It is another aspect of the invention to provide a BLDC motor phase commutation method in which different phase commutation schemes are used depending on operating modes of the BLDC motor, so that phase commutation timing can be determined more correctly when the BLDC motor is in a stable operating range.

In accordance with an aspect of the invention, there is provided a BLDC motor phase commutation method, wherein, when a BLDC motor performs phase commutation after rotating through a mechanical angle corresponding to a first period, operation of the BLDC motor in a phase commutation section of a period next to the first period is controlled to be performed in the same manner as in a first phase commutation section of the first period.

A phase commutation time and a position detection time in the phase commutation section of the next period may be controlled to be equal to a phase commutation time and a position detection time in the first phase commutation section of the first period.

A period of Zero Crossing Points (ZCPs) of a back electromotive force (EMF) of the BLDC motor in the phase commutation section of the next period may be controlled to be equal to a period of ZCPs in the first phase commutation section of the first period.

In accordance with another aspect of the invention, there is provided a BLDC motor phase commutation method, wherein, when a BLDC motor rotates through a mechanical angle corresponding to one period, a time interval of a first phase commutation section of the period is set to be equal to an average of time intervals of first phase commutation sections of periods prior to the period.

The time intervals of the phase commutation sections may be time intervals at which ZCP signals occur from a back EMF signal of the BLDC motor, each of the ZCP signals occurring when the back EMF signal crosses zero phase.

In accordance with still another aspect of the invention, there is provided a BLDC motor phase commutation method, wherein, when a BLDC motor rotates through a mechanical angle corresponding to one period, the BLDC motor operates according to a first scheme in which operation of the BLDC motor in a first phase commutation section of a period is performed in the same manner as in a last phase commutation section of a period immediately prior to the period, and after the BLDC motor switches to sensorless mode, the BLDC motor operates according to a third scheme in which a first phase commutation section of a period has a time interval equal to an average of time intervals of first phase commutation sections of periods prior to the period.

When the BLDC motor rotates for a period, the BLDC motor may switch to the sensorless mode if the difference between maximum and minimum values of time intervals of phase commutation sections of the period is less or equal to a predetermined value.

If speed of the BLDC motor enters a predetermined range after the BLDC motor operates according to the first scheme, the BLDC motor may operate according to a second scheme in which a first phase commutation section of a period has a time interval equal to an average of time intervals of all phase commutation sections of a period immediately prior to the period.

In accordance with yet another aspect of the invention, there is provided a BLDC motor phase commutation method, wherein, when a BLDC motor rotates through a mechanical angle corresponding to one period, the BLDC motor operates according to a second scheme in which a first phase commutation section of a period has a time interval equal to an average of time intervals of all phase commutation sections of a period immediately prior to the period, and after the BLDC motor switches to sensorless mode, the BLDC motor operates according to a third scheme in which a first phase commutation section of a period has a time interval equal to an average of time intervals of first phase commutation sections of periods prior to the period.

When the BLDC motor rotates for a period, the BLDC motor may switch to the sensorless mode if the difference between maximum and minimum values of time intervals of phase commutation sections of the period is less or equal to a predetermined value.

The time intervals of the phase commutation sections may be time intervals at which ZCP signals occur from a back EMF signal of the BLDC motor, each of the ZCP signals occurring when the back EMF signal crosses zero phase.

BRIEF DESCRIPTION OF THE DRAWINGS

The above and/or other aspects of the invention will become apparent and more readily appreciated from the following description of the exemplary embodiments, taken in conjunction with the accompanying drawings of which.

DETAILED DESCRIPTION OF THE EXEMPLARY EMBODIMENTS

Reference will now be made in detail to the exemplary embodiments of the present invention, examples of which are illustrated in the accompanying drawings, wherein like reference numerals refer to the like elements throughout. The exemplary embodiments are described below to explain the present invention by referring to the figures.

Figure 1:
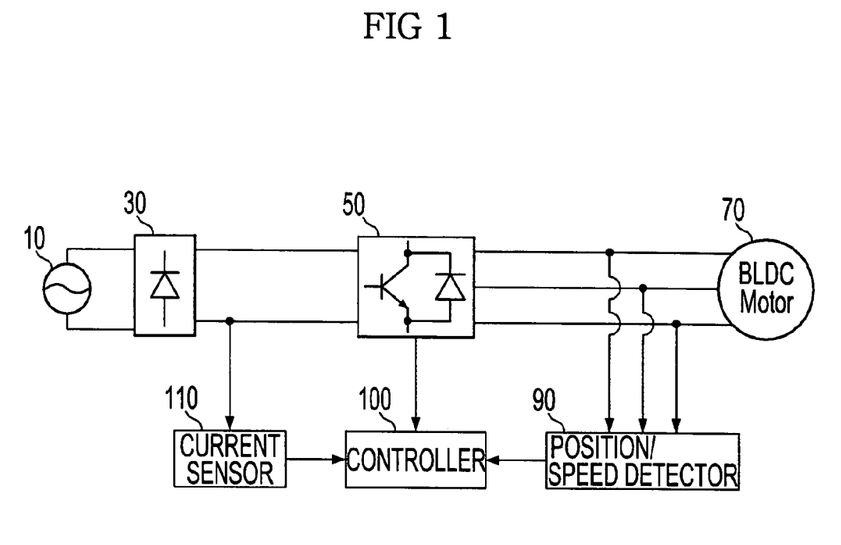
FIG. 1 is a block diagram of a BLDC motor control device according to an exemplary embodiment of the present invention.

As shown in FIG. 1, a BLDC motor control device according to an exemplary embodiment of the present invention comprises a power source 10, an AC-to-DC power converter 30, an inverter 50, a position/speed detector 90, a current sensor 110, and a controller 100. The power source 10 supplies commercial AC power, and the converter 30 converts the AC power into DC power. The inverter 50 converts the DC power output from the converter 30 into three-phase (U, V and W) AC power by alternately turning on and off a plurality of power transistors in order to rotate a BLDC motor 70. The position/speed detector 90 detects a back EMF of the BLDC motor 70 to detect a rotor position signal. The current sensor 110 detects a current between the converter 30 and the inverter 50. The controller 100 controls the rotation speed of the BLDC motor 70 on the basis of the rotor position, detected by the position/speed detector using the back EMF of the BLDC motor 70, and the current information detected by the current sensor 110. The inverter 50 generates an inverter control signal to, control the current of each phase and phase commutation timing of the three-phase AC power output from the inverter 50, thereby allowing the BLDC motor 70 to rotate according to a control signal from the controller 100.

As the BLDC motor 70 rotates, a back EMF is generated in each coil. The controller 100 for controlling the motor generates a Zero Crossing Point (ZCP) signal each time the back EMF crosses zero phase of the common point of the motor, and applies a voltage to each coil according to the ZCP signal. The ZCP signal indicates a zero crossing point of the back EMF signal, whose period varies depending on the rotation speed of the BLDC motor 70.

To stably operate the BLDC motor 70, it is necessary to apply an accurate three-phase voltage to one coil when a ZCP signal of the back EMF is output to another coil. Therefore, accurate detection of the zero crossing point of the back EMF is essential to stable operation of the motor.

Figure 2:
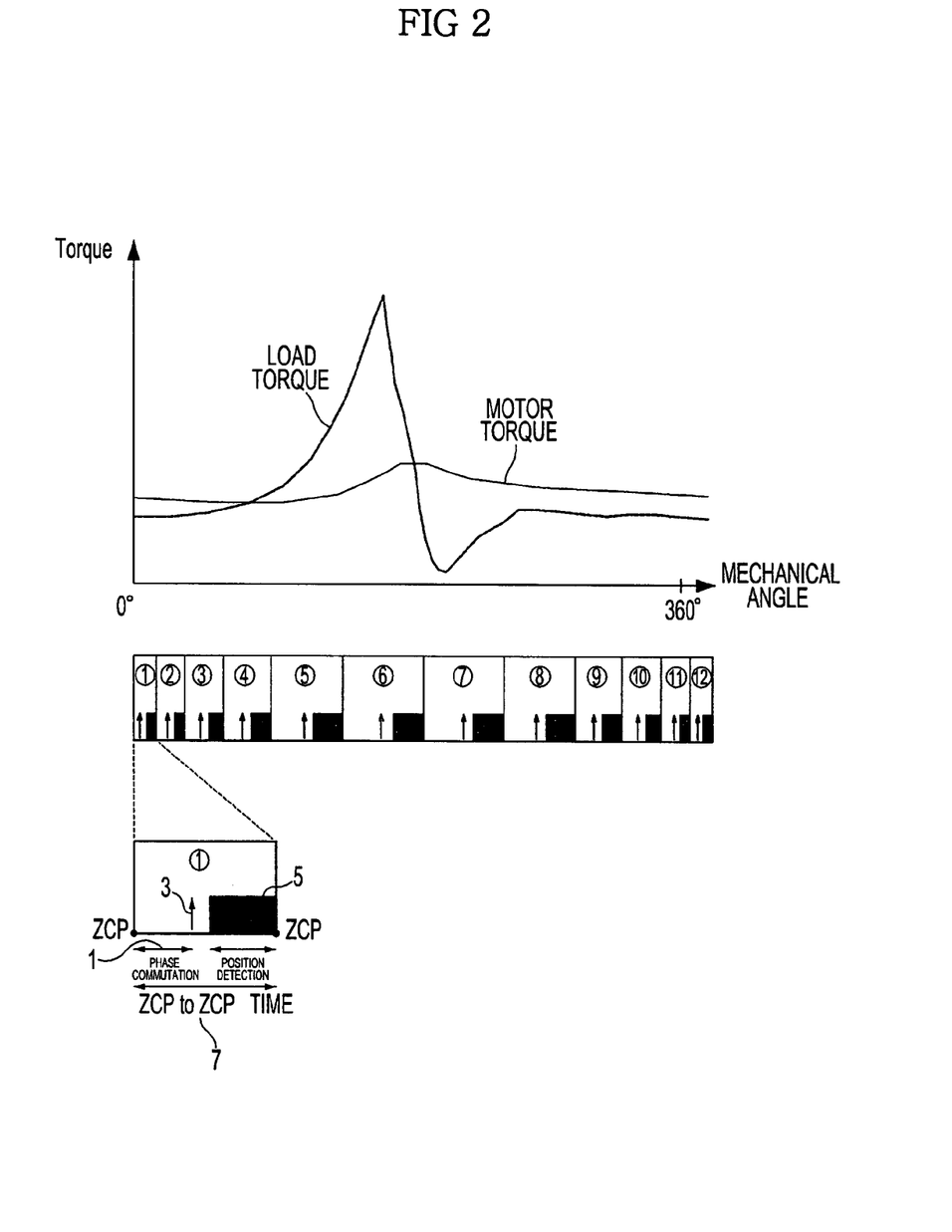
FIG. 2 is a schematic diagram illustrating an exemplary phase commutation method when the BLDC motor shown in FIG. 1 rotates through a mechanical angle corresponding to one period.

As shown in FIG. 2, a phase commutation four-pole BLDC motor 70 rotates 360 mechanical degrees when 12 phase commutations are performed. That is, as the 1st to 12th phase commutations (① to ⑫) are performed, the BLDC motor 70 mechanically rotates one turn. Referring to a first phase commutation section ① in FIG. 2, it can be seen that one phase commutation section corresponds to a time interval 7 from the time when a ZCP signal of the back EMF is output to the time when the next ZCP signal of the back EMF is output. One part of the phase commutation section is a time interval 1 during which phase commutation is actually performed, and the other part thereof is a time interval 5 during which rotor position detection is performed. Phase commutation of the first phase commutation section ① is performed actually until a time 3 in the first phase commutation section ①.

The actual phase commutation duration 1, the position detection interval 5 and the ZCP-to-ZCP interval 7 of each of the phase commutation sections while the BLDC motor 70 rotates through a mechanical angle corresponding to one turn vary depending on load torque of the BLDC motor 70. If refrigerant in a refrigerator is assumed as a load in the example of FIG. 2, it can be seen that the torque of the BLDC motor 70 varies in proportion to changes in the load torque as the load torque gradually increases and then decreases in one period. This is due to the fact that, if refrigerant is used as a load as in a refrigerator, large variation occurs in the load applied to the motor for each rotation. An increase in the motor torque indicates an increase in the rotation speed of the motor. It can be seen from FIG. 2 that the ZCP-to-ZCP time interval 7 increases as the motor torque increases and thus the rotation speed increases. Also, as the rotation speed of the motor increases, the phase commutation section duration 1 decreases.

If the BLDC motor 70 rotates through a mechanical angle corresponding to one turn so that 12 phase commutations are performed, completing one period, the BLDC motor 70 enters the next period and again rotates through a mechanical angle corresponding to one turn. According to exemplary embodiments of the present invention, there are various schemes for performing the first phase commutation of the second period (i.e., the 13th phase commutation ③) after the 12th phase commutation ② of the first period is completed.

In a first scheme, the 13th phase commutation ③ is performed in the same manner as in the 12th phase commutation section. This scheme is typically used to detect phase commutation timing and position detection timing when the BLDC motor 70 has a large speed variation at initial startup.

In a second scheme, ZCP-to-ZCP time interval values 7 of the 1st to 12th phase commutation sections are stored in a memory while the BLDC motor 70 rotates through a mechanical angle corresponding to one period, and the average of the stored ZCP-to-ZCP time interval values 7 is calculated if the 12th phase commutation ② is completed, and the calculated average is set as a ZCP-to-ZCP time interval 7 of the 13th phase commutation section ③. This phase commutation scheme is used when the speed of the BLDC motor 70 reaches a certain level.

Figure 3:
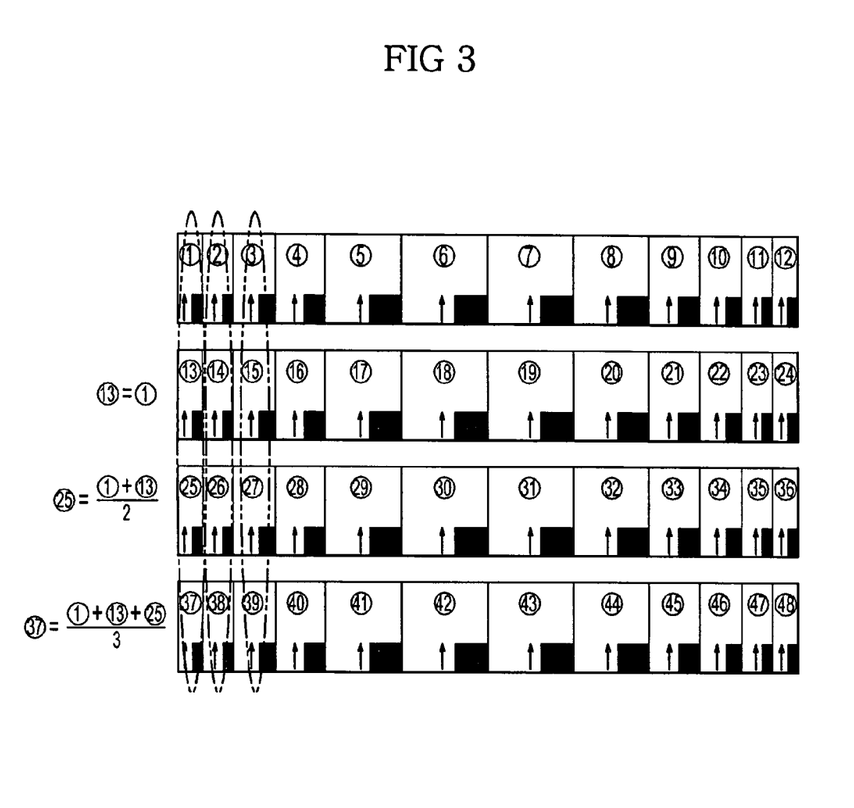
FIG. 3 is a schematic diagram illustrating a phase commutation method according to a third scheme of the BLDC motor shown in FIG. 1 according to an exemplary embodiment of the present invention.

In a third scheme, as shown in FIG. 3, the ZCP-to-ZCP time interval 7 of the 13th phase commutation section ③ is set to be equal to the ZCP-to-ZCP time interval 7 of the 1st phase commutation section ①, and a ZCP-to-ZCP time interval 7 of the 25th phase commutation section ⑤ which is the first phase commutation section of the 3rd period, is set to be equal to the average of the ZCP-to-ZCP time intervals 7 of the 1st and 13th phase commutation sections ① and ③. This phase commutation scheme is used when the BLDC motor 70 operates stably, in such a manner that the average of ZCP-to-ZCP time intervals of corresponding phase commutation sections of previous periods is calculated and the ZCP-to-ZCP time interval of a corresponding phase commutation section of a period next to the periods is set to be equal to the calculated average. Determination as to whether the BLDC motor 70 is in a stable operating range is based on the difference between the maximum and minimum of ZCP-to-ZCP values 7 of all phase commutation sections while the motor rotates through a mechanical angle corresponding to one period. Specifically, it is determined that the BLDC motor 70 is in a stable operating range, if the difference between the maximum and minimum ZCP-to-ZCP values 7 of one period is in a range set according to the specifications of a product in which the BLDC motor 70 is used.

Figure 4:
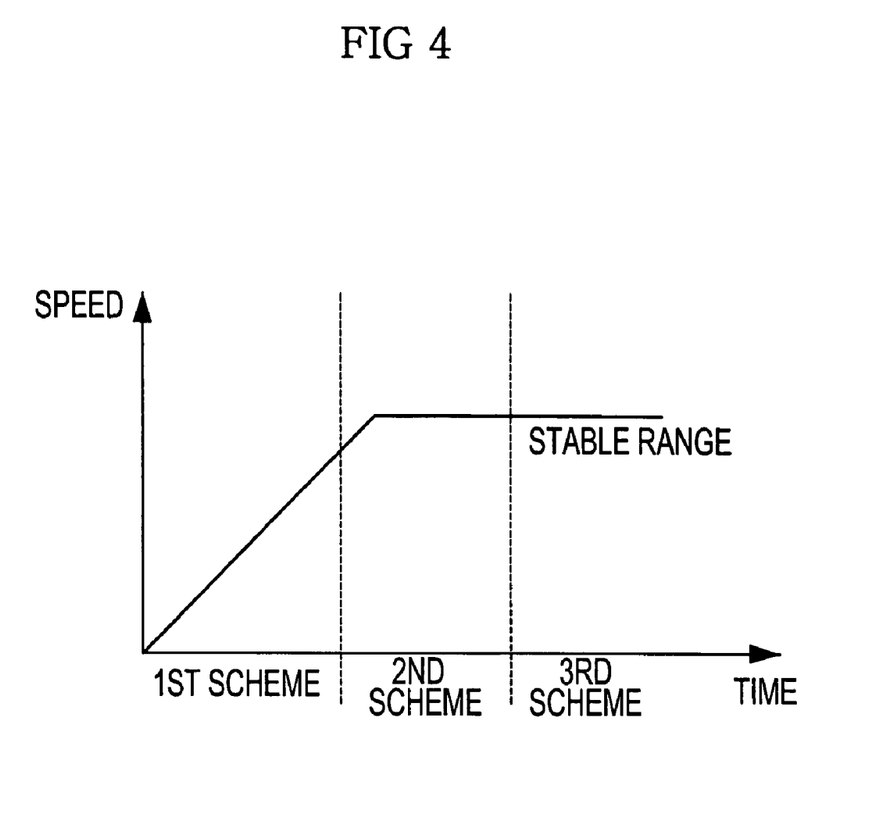
FIG. 4 is a graph illustrating different phase commutation schemes that are applied depending on operating states of the BLDC motor shown in FIG. 1 according to an exemplary embodiment of the present invention.

As shown in FIG. 4, at initial startup, the BLDC motor 70 performs phase commutation according to the first scheme. If the speed of the BLDC motor 70 rises to a certain level, the BLDC motor 70 switches the phase commutation method to the second scheme and performs phase commutation according to the second scheme. If the BLDC motor 70 enters a stable operating range, the BLDC motor 70 switches the phase commutation method to the third scheme and performs phase commutation according to the third scheme. Specifically, the BLDC motor 70 performs phase commutation according to the first and second schemes when it is in startup mode, and performs phase commutation according to the third scheme when it enters sensorless mode.

It is not necessary that the phase commutation method be switched to the third scheme 3 via the first and second schemes. For example, the BLDC motor 70 may also perform phase commutation according to the third commutation if the BLDC motor 70 enters a stable range while it is performing phase commutation according to one of the first and second schemes according to an operating condition or other conditions or designs of the BLDC motor 70.

Figure 5:
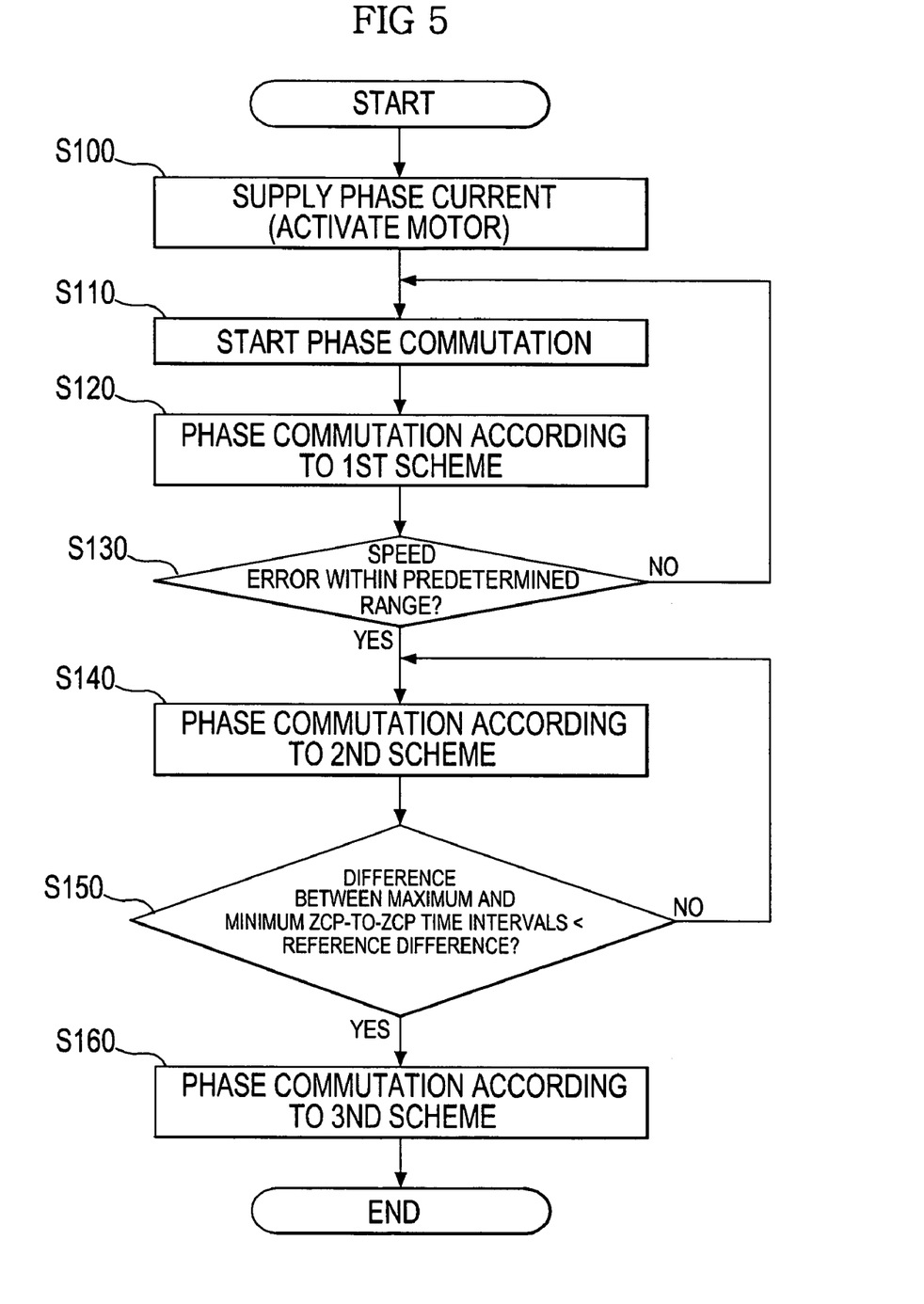
FIG. 5 is a flow chart of a phase commutation method of the BLDC motor shown in FIG. 1 according to an exemplary embodiment of the present invention.

The BLDC motor phase commutation method according to an exemplary embodiment of the present invention will now be described with reference to FIG. 5.

If the controller 100 transfers a signal, which requests startup of the BLDC motor 70, to each element, AC power is supplied from the power source 10, and the AC power is converted to DC power through the converter 30, and the DC power is then converted to three-phase AC power through the inverter 50. The three-phase AC power causes the BLDC motor 70 to rotate. As a non-inverting phase current is supplied to the BLDC motor 70 in this manner, the BLDC motor 70 starts operation (S100).

If the BLDC motor 70 starts operation, it can be determined whether phase commutation is being performed, using rotor position information. If phase commutation is initiated, the BLDC motor 70 performs phase commutation according to the first scheme (S110 and S120). That is, the 13th phase commutation is performed in the same manner as in the 12th phase commutation section ② under the assumption that 12 phase commutations are performed while the BLDC motor 70 rotates through a mechanical angle corresponding to one period.

While performing phase commutation according to the first scheme, the BLDC motor 70 determines whether the speed error of the BLDC motor 70 has entered a certain range (S130). Specifically, after initiating startup, the BLDC motor 70 determines whether the BLDC motor 70 has accelerated to enter a speed range predetermined according to the specifications. The BLDC motor 70 performs phase commutation according to the first scheme until the speed error enters the predetermined range.

If the speed error is within the predetermined range, the BLDC motor 70 switches the phase commutation method to the second scheme and performs phase commutation according to the second scheme (S140). The ZCP-to-ZCP time interval values of the 1st to 12th phase commutation sections ① to ② are stored in a memory while the motor rotates through a mechanical angle corresponding to one period. If the 12th phase commutation is completed, the average of the stored ZCP-to-ZCP time interval values is calculated, and the calculated average is set as the ZCP-to-ZCP time interval of the 13th phase commutation section ③.

As phase commutation is performed according to the second scheme, the maximum and minimum of the ZCP-to-ZCP time interval values 7 of all phase commutation sections while the motor rotates through a mechanical angle corresponding to one period are determined, and it is determined whether the difference between the determined maximum and minimum values is less than a predetermined reference value (S150).

If the difference between the maximum and minimum ZCP-to-ZCP time interval values is less than the predetermined reference value, it is determined that the BLDC motor 70 has entered a stable operating range, and thus phase commutation is performed according to the third scheme (S160). In the stable operating range, each ZCP-to-ZCP time interval of the phase commutation sections while the motor rotates through a mechanical angle corresponding to one period may be considered relatively invariant. Therefore, according to the third scheme, the average of ZCP-to-ZCP time interval values 7 of corresponding phase commutation sections of previous periods is set as the ZCP-to-ZCP time interval 7 of a corresponding phase commutation section of a period next to the period.

The above method can be effectively applied to apparatuses such as refrigerators or air conditioners in which load torque of a motor periodically varies as the motor rotates one turn.

As is apparent from the above description, a BLDC motor phase commutation method according to the exemplary embodiments of the present invention have the following advantages.

Phase commutation timing and position detection timing of a BLDC motor in a compressor are correctly detected to stabilize rotation and RPM of the compressor, thereby minimizing noise and vibration.

In addition, different phase commutation schemes are used depending on operating modes of the BLDC motor, so that phase commutation timing can be determined more correctly when the BLDC motor is in a stable operating range.

Although exemplary embodiments of the present invention have been shown and described, it would be appreciated by those skilled in the art that changes may be made in the exemplary embodiments without departing from the principles and spirit of the invention, the scope of which is defined in the claims and their equivalents.

What is claimed is:

1. A Brushless Direct Current (BLDC) motor phase commutation method comprising, when a BLDC motor performs phase commutation after rotating through a mechanical angle corresponding to a first period, controlling operation of the BLDC motor in a phase commutation section of a period next to the first period to be performed in a same manner as in a first phase commutation section of the first period, wherein a duration of the phase commutation sections of the first period is not fixed, and wherein the controlling the operation comprises controlling a phase commutation time and a position detection time in the phase commutation section of the period next to the first period to be equal to a phase commutation time and a position detection time in the first phase commutation section of the first period.

2. A Brushless Direct Current (BLDC) motor phase commutation method comprising, when a BLDC motor performs phase commutation after rotating through a mechanical angle corresponding to a first period, controlling operation of the BLDC motor in a phase commutation section of a period next to the first period to be performed in a same manner as in a first phase commutation section of the first period, wherein a duration of the chase commutation sections of the first period is not fixed, and wherein the controlling the operation comprises controlling a period of Zero Crossing Points (ZCPs) of a back electromotive force (EMF) of the BLDC motor in the phase commutation section of the period next to the first period to be equal to a period of ZCPs in the first phase commutation section of the first period.

3. A Brushless Direct Current (BLDC) motor phase commutation method comprising, when a BLDC motor rotates through a mechanical angle corresponding to one period, setting a time interval of a first phase commutation section of the period to be equal to an average of time intervals of first phase commutation sections of periods prior to the period, wherein a duration of the phase commutation sections of the first period is not fixed.

4. The method according to claim 3, wherein the time intervals of the phase commutation sections are time intervals at which Zero Crossing Point (ZCP) signals occur from a back electromotive force (EMF) signal of the BLDC motor, each of the ZCP signals occurring when the back EMF signal crosses zero phase.

5. A Brushless Direct Current (BLDC) motor phase commutation method comprising:
 (a) when a BLDC motor rotates through a mechanical angle corresponding to one period, operating the BLDC motor according to a first scheme in which a first phase commutation section of a first period is performed in a same manner as in a last phase commutation section of a period immediately prior to the first period, and
 (b) after the BLDC motor switches to a sensorless mode, operating the BLDC motor according to a second scheme in which a first phase commutation section of a second period, which is subsequent to the first period, has a time interval which is equal to an average of time intervals of first phase commutation sections of periods prior to the second period.

6. The method according to claim 5, wherein (b) comprises switching the BLDC motor to the sensorless mode if a difference between maximum and minimum values of time intervals of phase commutation sections of a period is less than or equal to a predetermined value.

7. The method according to claim 5, further comprising (c) if a speed of the BLDC motor enters a predetermined range after the BLDC motor operates according to the first scheme, the BLDC motor operates according to a third scheme in which a first phase commutation section of a third period, which is subsequent to the first period and prior to the second period, has a time interval equal to an average of time intervals of all phase commutation sections of a period immediately prior to the third period.

8. The method according to claim 5, wherein the time intervals of the phase commutation sections are time intervals at which Zero Crossing Point (ZCP) signals occur from a back EMF signal of the BLDC motor, each of the ZCP signals occurring when the back EMF signal crosses zero phase.

9. Brushless Direct Current (BLDC) motor phase commutation method comprising:
 (a) when a BLDC motor rotates through a mechanical angle corresponding to one period, operating the BLDC motor according to a first scheme in which a first phase commutation section of a first period has a time interval equal to an average of time intervals of all phase commutation sections of a period immediately prior to the first period, and
 (b) after the BLDC motor switches to a sensorless mode, operating the BLDC motor according to a second scheme in which a first phase commutation section of a second period, subsequent to the first period, has a time interval which is equal to an average of time intervals of first phase commutation sections of periods prior to the second period.

10. The method according to claim 9, wherein (b) comprises switching the BLDC motor to the sensorless mode if a difference between maximum and minimum values of time intervals of phase commutation sections of a period is less than or equal to a predetermined value.

11. The method according to claim 9, wherein the time intervals of the phase commutation sections are time intervals at which Zero Crossing Point (ZCP) signals occur from a back electromotive force (EMF) signal of the BLDC motor, each of the ZCP signals occurring when the back EMF signal crosses zero phase.

\* \* \* \* \*